(12) United States Patent
Stockett et al.

(10) Patent No.: US 11,279,085 B2
(45) Date of Patent: Mar. 22, 2022

(54) SYSTEM FOR ADDITIVE MANUFACTURING

(71) Applicant: Continuous Composites Inc., Coeur d'Alene, ID (US)

(72) Inventors: Ryan C. Stockett, Spokane, WA (US); Tyler B. Alvarado, Coeur d'Alene, ID (US); Stephen Tyler Wilson, Coeur d'Alene, ID (US)

(73) Assignee: Continuous Composites Inc., Coeur d'Alene, ID (US)

( * ) Notice: Subject to any disclaimer, the term of this patent is extended or adjusted under 35 U.S.C. 154(b) by 0 days.

(21) Appl. No.: 16/655,066

(22) Filed: Oct. 16, 2019

(65) Prior Publication Data

US 2020/0130296 A1 Apr. 30, 2020

Related U.S. Application Data

(60) Provisional application No. 62/751,461, filed on Oct. 26, 2018.

(51) Int. Cl.
*B29C 70/38* (2006.01)
*B29C 64/209* (2017.01)
(Continued)

(52) U.S. Cl.
CPC .......... *B29C 64/209* (2017.08); *B29C 64/106* (2017.08); *B29C 64/118* (2017.08);
(Continued)

(58) Field of Classification Search
CPC ..... B29C 64/118; B29C 64/295; B29C 70/54; B29C 70/384; B29C 64/106; B29C 64/393; B29C 64/209; B29C 70/382; B29C 70/38; B29C 64/314; Y02P 10/25; B29B 15/127; B33Y 30/00; B33Y 10/00; B33Y 50/02; B33Y 70/00; B22F 10/20; B29K 2101/10

See application file for complete search history.

(56) References Cited

U.S. PATENT DOCUMENTS 3,286,305 A 11/1966 Seckel
3,809,514 A 5/1974 Nunez
(Continued)

FOREIGN PATENT DOCUMENTS

DE 4102257 A1 7/1992
EP 2589481 B1 1/2016
(Continued)

OTHER PUBLICATIONS

International Search Report dated Jan. 31, 2020 for PCT/US2019/057412 to Continuous Composites Inc. Filed Oct. 22, 2019.
(Continued)

*Primary Examiner* — Vishal I Patel
(74) *Attorney, Agent, or Firm* — Ryan C. Stockett (57) ABSTRACT

A system is disclosed for additively manufacturing a composite structure. The system may include a support, and a print head connected to and moveable by the support. The print head may have a first tool center point associated with discharge of a first material, and a second tool center point associated with discharge of a second material that is a type different than the first material.

13 Claims, 4 Drawing Sheets

(51) Int. Cl.
  *B29C 64/118* (2017.01)
  *B33Y 70/00* (2020.01)
  *B29C 64/393* (2017.01)
  *B33Y 30/00* (2015.01)
  *B29C 70/54* (2006.01)
  *B29C 64/295* (2017.01)
  *B29C 64/106* (2017.01)
  *B29K 101/10* (2006.01)
  *B33Y 10/00* (2015.01)

(52) U.S. Cl.
  CPC .......... *B29C 64/295* (2017.08); *B29C 64/393* (2017.08); *B29C 70/384* (2013.01); *B29C 70/54* (2013.01); *B33Y 30/00* (2014.12); *B33Y 70/00* (2014.12); *B29K 2101/10* (2013.01); *B33Y 10/00* (2014.12)

(56) References Cited

U.S. PATENT DOCUMENTS

| | | |
|---|---|---|
| 3,984,271 A | 10/1976 | Gilbu |
| 3,993,726 A | 11/1976 | Moyer |
| 4,643,940 A | 2/1987 | Shaw et al. |
| 4,671,761 A | 6/1987 | Adrian et al. |
| 4,822,548 A | 4/1989 | Hempel |
| 4,851,065 A | 7/1989 | Curtz |
| 5,002,712 A | 3/1991 | Goldmann et al. |
| 5,037,691 A | 8/1991 | Medney et al. |
| 5,296,335 A | 3/1994 | Thomas et al. |
| 5,340,433 A | 8/1994 | Crump |
| 5,746,967 A | 5/1998 | Hoy et al. |
| 5,866,058 A | 2/1999 | Batchelder et al. |
| 5,936,861 A | 8/1999 | Jang et al. |
| 6,153,034 A | 11/2000 | Lipsker |
| 6,459,069 B1 | 10/2002 | Rabinovich |
| 6,501,554 B1 | 12/2002 | Hackney et al. |
| 6,799,081 B1 | 9/2004 | Hale et al. |
| 6,803,003 B2 | 10/2004 | Rigali et al. |
| 6,934,600 B2 | 8/2005 | Jang et al. |
| 7,039,485 B2 | 5/2006 | Engelbart et al. |
| 7,555,404 B2 | 6/2009 | Brennan et al. |
| 7,795,349 B2 | 9/2010 | Bredt et al. |
| 8,221,669 B2 | 7/2012 | Batchelder et al. |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Peters et al. |
| 9,770,876 B2 | 9/2017 | Farmer et al. |
| 9,782,926 B2 | 10/2017 | Witzel et al. |
| 10,081,129 B1* | 9/2018 | Alvarado ............... B29C 31/045 |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0165304 A1 | 11/2002 | Mulligan et al. |
| 2003/0044539 A1 | 3/2003 | Oswald |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2005/0006803 A1 | 1/2005 | Owens |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2007/0003650 A1 | 1/2007 | Schroeder |
| 2007/0228592 A1 | 10/2007 | Dunn et al. |
| 2008/0176092 A1 | 7/2008 | Owens |
| 2009/0095410 A1 | 4/2009 | Oldani |
| 2011/0032301 A1 | 2/2011 | Fienup et al. |
| 2011/0143108 A1 | 6/2011 | Fruth et al. |
| 2012/0060468 A1 | 3/2012 | Dushku et al. |
| 2012/0159785 A1 | 6/2012 | Pyles et al. |
| 2012/0231225 A1 | 9/2012 | Mikulak et al. |
| 2012/0247655 A1 | 10/2012 | Erb et al. |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0061974 A1 | 3/2014 | Tyler |
| 2014/0159284 A1 | 6/2014 | Leavitt |
| 2014/0232035 A1 | 8/2014 | Bheda |
| 2014/0268604 A1 | 9/2014 | Wicker et al. |
| 2014/0291886 A1 | 10/2014 | Mark et al. |
| 2015/0136455 A1 | 5/2015 | Fleming |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0176123 A1 | 6/2016 | Pedigo et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1* | 1/2017 | Deaville ............... B29C 70/386 |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |

(56) References Cited

U.S. PATENT DOCUMENTS

| | | |
|---|---|---|
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1* | 2/2017 | Evans .................. B29C 70/545 |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017077508 A1 | 5/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

* cited by examiner

SYSTEM FOR ADDITIVE MANUFACTURING

RELATED APPLICATIONS

This application is based on and claims the benefit of priority from U.S. Provisional Application No. 62/751,461 that was filed on Oct. 26, 2018, the contents of which are expressly incorporated herein by reference.

TECHNICAL FIELD

The present disclosure relates generally to a manufacturing system and, more particularly, to a system for additively manufacturing composite structures and a method of operating the system.

BACKGROUND

Automated Fiber Placement (a.k.a., AFP) involves the placement of pre-impregnated tapes of fibers by a robotically manipulated print head. The fibers can be pre-impregnated with a resin, for example a thermoset resin, partially cured so they can be handled, applied with a backing, and then rolled onto spools in tape form. The tapes are thereafter fed through the print head, wherein the backing is removed, and under a compaction roller that presses the tape onto the surface of a mold. In some applications the substrate (e.g., the surface of the mold or an underlying layer) can be heated to make it tacky prior to the tape application. After application of the tape is complete, the mold is moved into an autoclave, where curing of the resin is completed. Although AFP may be an industry standard for manufacturing lightweight and high-strength structures, the process may be expensive, time consuming, wasteful, and design-limited.

Continuous fiber 3D printing (a.k.a., CF3D®) may be an improvement over AFP. CF3D® involves the use of continuous fibers that are at least partially coated with a matrix inside of a moveable print head, just prior to discharge from the print head. The matrix can be a thermoplastic, a thermoset, a powdered metal, or a combination of any of these and other known matrixes. Upon exiting the print head, a head-mounted cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space, without the need for a mold or an autoclave. An example of this technology is disclosed in U.S. Pat. No. 9,511,543 that issued to Tyler on Dec. 6, 2016 ("the '543 patent"). CF3D® may be less expensive, faster, and more efficient than AFP. In addition, CF3D® may have greater design flexibility.

Although CF3D® may have benefits over AFP, synergies be made realized via unique combinations of and/or cooperation between AFP and CF3D® components. The disclosed additive manufacturing system and method are uniquely configured to provide these improvements and/or to address other issues of the prior art.

SUMMARY

In one aspect, the present disclosure is directed to a system for additively manufacturing a composite structure. The system may include a support, and a print head connected to and moveable by the support. The print head may have a first tool center point associated with discharge of a first material, and a second tool center point associated with discharge of a second material that is a type different than the first material.

In another aspect, the present disclosure is directed to a method of additively manufacturing a composite structure. The method may include directing a reinforcement tape that is pre-impregnated with a matrix past a heat source to tackify the reinforcement tape, and compacting the tacky reinforcement tape to form a first portion of the composite structure. The method may further include wetting a reinforcement with a matrix in-situ, compacting the wetted reinforcement to form a second portion of the composite structure, and at least triggering curing the matrix. The method may further include autoclaving the structure to complete curing of the tacky reinforcement tape and the matrix.

In yet another aspect, the present disclosure is directed to another method of additively manufacturing a composite structure. This method may include discharging a first material from a print head at a first tool center point, and discharging a second material that is a type different than the first material from the print head at a second tool center point that is different than the first tool center point. The method may further include selectively moving the printhead based a known location of the first tool center point or a known location of the second tool center point and desired geometry of the composite structure.

DETAILED DESCRIPTION

Figure 1:
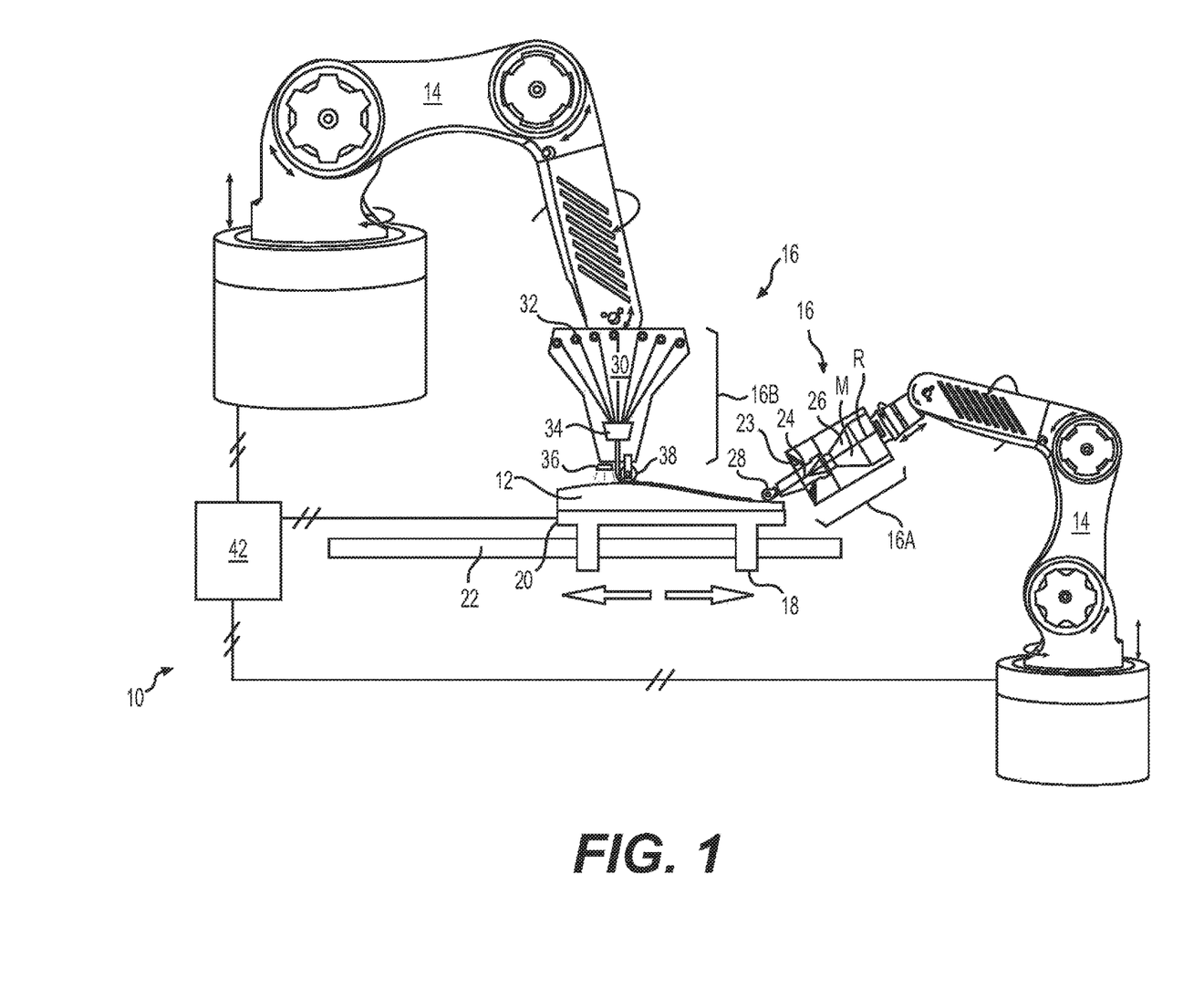
FIG. 1 is an isometric illustration of an exemplary disclosed additive manufacturing system.

FIG. 1 illustrates an exemplary system 10, which may be used to manufacture a composite structure 12 having any desired shape. System 10 may include at least one support 14 and at least one deposition head ("head") 16. In the disclosed embodiment, two supports 14 are illustrated as independently supporting two different heads 16A and 16B. It is contemplated, however, that a single support 14 could simultaneously support both of heads 16A and 16, or that heads 16A and 16B could be interchangeably connected to a single support 14, one at a time (e.g., via a tool coupler—not shown).

Heads 16A and 16B may be coupled to and moved by support(s) 14. In the disclosed embodiment of FIG. 1, supports 14 are robotic arms (identical or different arms) capable of moving heads 16A and 16B in multiple directions during fabrication of structure 12. One or both of support(s) 14 may alternatively embody an overhead gantry or a hybrid gantry/arm also capable of moving heads 16A and 16B in multiple directions during fabrication of structure 12. Although supports 14 are shown as being capable of 6-axis movements, it is contemplated that supports 14 may be capable of moving heads 16A and 16B in a different manner (e.g., along or around a greater or lesser number of axes). In some embodiments, a drive may mechanically couple heads 16 to support(s) 14, and include components that cooperate to move portions of and/or supply power or materials to head 16.

One or both of heads 16A and 16B may be capable of reaching all required portions of structure 12 during fabrication via motion of support(s) 14 alone. However, it is contemplated that a moveable part holder 18 may be beneficial in some embodiments to selectively shuttle structure 12 between separate work areas associated with heads 16A and 16B. In the disclosed embodiment, part holder 18 includes a platform 20 that is slidably mounted to one or more rails 22. In response to a motion command, actuators (e.g., motors, pistons, etc.—not shown) associated with platform 20 and/or rail(s) 22 may selectively cause the desired shuttling. It is contemplated that other types of part holders known in the art could alternatively be utilized to shuttle structure 12 between the separate work areas. In contrast, it is contemplated that structure 12 may remain stationary and one or both of supports 14 could alternatively be associated with rail 22 and configured to slide between work areas. Finally, it is contemplated that part holder 18 and one or both of supports 14 could be configured to move in a coordinated manner between work areas.

Figure 2:
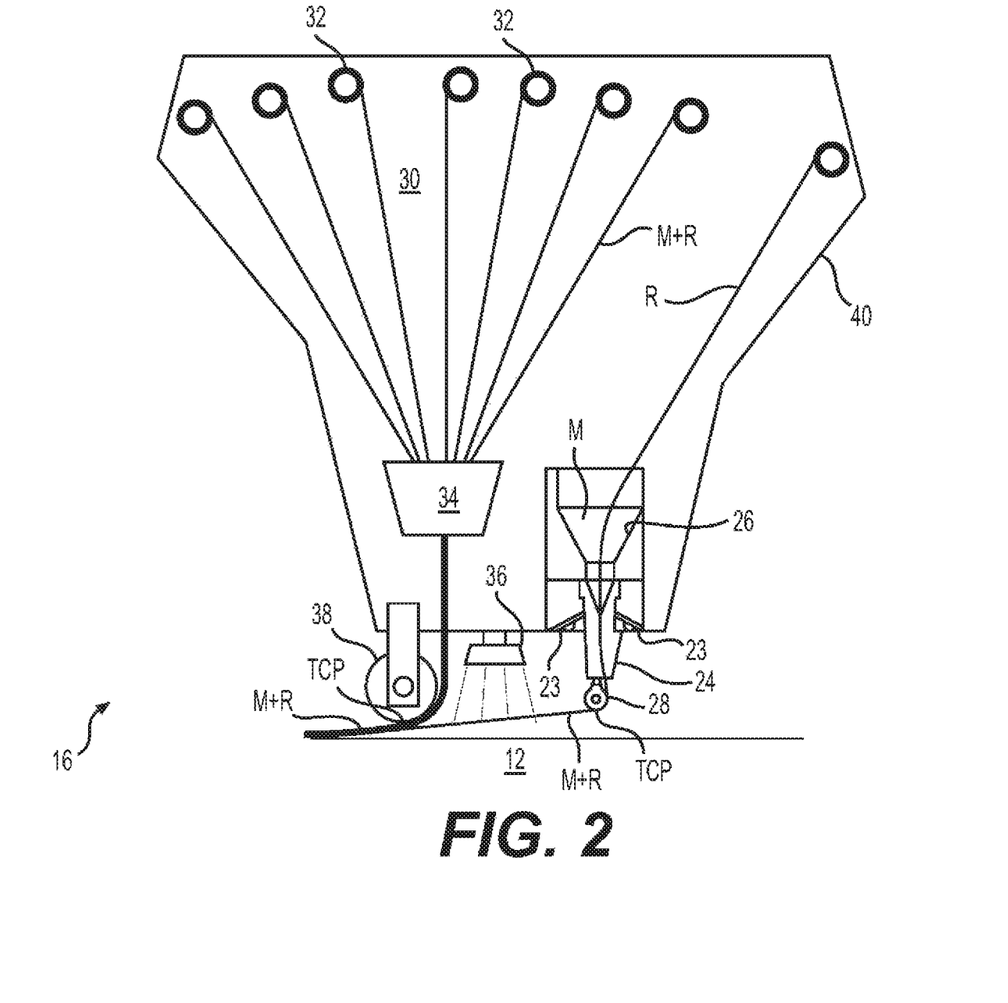
FIG. 2 is a cross-sectional illustration of an exemplary print head that may be used in conjunction with the additive manufacturing system of FIG. 1.

Head 16A may be configured to receive or otherwise contain a matrix (shown as M in FIGS. 1 and 2). The matrix may include any type of matrix (e.g., a liquid resin, such as a zero-volatile organic compound resin, a powdered metal, etc.) that is curable. Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix inside head 16A may be pressurized, for example by an external device (e.g., by an extruder, a pump, etc.—not shown) that is fluidly connected to head 16A via a corresponding conduit (not shown). In another embodiment, however, the pressure may be generated completely inside of head 16A by a similar type of device. In yet other embodiments, the matrix may be gravity-fed into and/or through head 16. For example, the matrix may be fed into head 16A, and pushed or pulled out of head 16A along with one or more continuous reinforcements (shown as R in FIGS. 1 and 2). In some instances, the matrix inside head 16A may need to be kept cool and/or dark in order to inhibit premature curing or otherwise obtain a desired rate of curing after discharge. In other instances, the matrix may need to be kept warm and/or illuminated for similar reasons. In either situation, head 16A may be specially configured (e.g., insulated, temperature-controlled, shielded, etc.) to provide for these needs.

The matrix may be used to coat any number of continuous reinforcements (e.g., separate fibers, tows, rovings, socks, and/or sheets of continuous material) and, together with the reinforcements, make up a portion (e.g., a wall) of composite structure 12. The reinforcements may be stored within (e.g., on one or more separate internal spools) or otherwise passed through head 16A (e.g., fed from one or more external spools). When multiple reinforcements are simultaneously used, the reinforcements may be of the same material composition and have the same sizing and cross-sectional shape (e.g., circular, square, rectangular, etc.), or a different material composition with different sizing and/or cross-sectional shapes. The reinforcements may include, for example, carbon fibers, vegetable fibers, wood fibers, mineral fibers, glass fibers, metallic wires, optical tubes, plastic fibers (e.g., UHMWPE), etc. It should be noted that the term "reinforcement" is meant to encompass both structural and non-structural types (e.g., functional types) of continuous materials that are at least partially encased in the matrix discharging from head 16.

The reinforcements may be exposed to (e.g., at least partially coated with) the matrix while the reinforcements are inside head 16A, while the reinforcements are being passed to head 16A, and/or while the reinforcements are discharging from head 16A. The matrix, dry (e.g., unimpregnated) reinforcements, and/or reinforcements that are already exposed to the matrix may be transported into head 16A in any manner apparent to one skilled in the art. In some embodiments, a filler material (e.g., chopped fibers) may be mixed with the matrix before and/or after the matrix coats the continuous reinforcements.

One or more cure enhancers (e.g., a UV light, an ultrasonic emitter, a laser, a heater, a catalyst dispenser, etc.) 23 may be mounted proximate (e.g., within, on, and/or adjacent) head 16A and configured to enhance a cure rate and/or quality of the matrix as it is discharged from head 16A. Cure enhancer 23 may be controlled to selectively expose portions of structure 12 to energy (e.g., UV light, electromagnetic radiation, vibrations, heat, a chemical catalyst, etc.) during material discharge and the formation of structure 12. The energy may trigger a chemical reaction to occur within the matrix, increase a rate of the chemical reaction, sinter the matrix, harden the matrix, or otherwise cause the matrix to cure as it discharges from head 16. The amount of energy produced by cure enhancer 23 may be sufficient to cure the matrix before structure 12 axially grows more than a predetermined length away from head 16. In one embodiment, structure 12 is completely cured before the axial growth length becomes equal to an external diameter of the matrix-coated reinforcement.

The matrix and/or reinforcement may be discharged from head 16A via at least two different modes of operation. In a first mode of operation, the matrix and/or reinforcement are extruded (e.g., pushed under pressure and/or mechanical force) from head 16A as head 16A is moved by support 14 to create features of structure 12. In a second mode of operation, at least the reinforcement is pulled from head 16A, such that a tensile stress is created in the reinforcement during discharge. In this mode of operation, the matrix may cling to the reinforcement and thereby also be pulled from head 16A along with the reinforcement, and/or the matrix may be discharged from head 16A under pressure along with the pulled reinforcement. In the second mode of operation, where the matrix is being pulled from head 16A with the reinforcement, the resulting tension in the reinforcement may increase a strength of structure 12 (e.g., by aligning the reinforcements, inhibiting buckling, etc.), while also allowing for a greater length of unsupported structure 12 to have a straighter trajectory. That is, the tension in the reinforcement remaining after curing of the matrix may act against the force of gravity (e.g., directly and/or indirectly by creating moments that oppose gravity) to provide support for structure 12.

The reinforcement may be pulled from head 16A as a result of head 16A being moved by support 14 away from an anchor point (e.g., away from part holder 18). In particular, at the start of structure formation, a length of matrix-impregnated reinforcement may be pulled and/or pushed from head 16, deposited onto part holder 18, and cured, such that the discharged material adheres (or is otherwise coupled) to part holder 18. Thereafter, head 16A may be moved away from part holder 18, and the relative movement may cause the reinforcement to be pulled from head 16A. It should be noted that the movement of reinforcement through head 16A could be assisted via internal feed mechanisms, if desired. However, the discharge rate of reinforcement from head 16A may primarily be the result of relative movement between head 16A and part holder 18, such that tension is created within the reinforcement. As discussed above, part holder 18 could be moved away from head 16A instead of or in addition to head 16A being moved away from part holder 18.

As can be seen in FIG. 1, head 16A may include, among other things, an outlet 24 and a matrix reservoir 26 located upstream of outlet 24. In this example, outlet 24 is a single-channel nozzle configured to discharge composite material having a generally circular, tubular, or rectangular cross-section. The configuration of head 16, however, may allow outlet 24 to be swapped out for another outlet (not shown) that discharges composite material having a different shape (e.g., a flat or sheet-like cross-section, a multi-track cross-section, etc.). Fibers, tubes, and/or other reinforcements may pass through matrix reservoir 26 and be wetted (e.g., at least partially coated and/or fully saturated) with matrix prior to discharge.

In the disclosed embodiment, a compactor 28 is located adjacent outlet 24, and between outlet 24 and cure enhancer 23. It is contemplated, however, that the positions of compactor 28 and cure enhancer 23 may be reversed, if desired. It is also contemplated that more than one compactor 28 may be utilized and organized in an alternating spatial arrangement relative to multiple cure enhancer(s) 23. Compactor 28 may embody any type of device known in the art for compressing the composite material discharging from outlet 24 and/or for pressing the material against a previously discharged layer of material. In the depicted example, compactor 28 is a roller-type compactor that is biased (e.g., via a spring—not shown) away from head 16A in an axial direction of outlet 24 and toward the discharging material. It is contemplated, however, that a shoe-type compactor, a skirt-type compactor, or another type of compactor could alternatively or additionally be utilized. Compactor 28 may be location- and/or pressure-adjustable, for example via an actuator (e.g., a hydraulic, pneumatic, and/or electric piston or motor—not shown).

Head 16B of FIG. 1 may be an automated fiber placement (AFP) head. Head 16B may include or otherwise be associated with a creel 30, on which any number of spools 32 may be mounted. Pre-impregnated reinforcements may be fed from spools 32 through a collimator 34, which arranges the reinforcements into a tape having desired characteristics (e.g., width, thickness, composition, etc.). It should be noted that, in some embodiments, the reinforcements may already have a desired tape-form on spools 32, thereby obviating the need for collimator 34. The tape may pass near a warming mechanism (e.g., a heating coil or a light) 36 to soften, melt, and/or otherwise tackify the tape, and then under a sliding and/or rolling compactor 38 that presses the tape onto an underlying surface (e.g., a surface of part holder 18, of structure 12, a support, or a surface of another adjacent structure). It should be noted that warming mechanism 36 may warm the tape prior to and/or only after deposition, as desired. A cutting/clamping/feeding mechanism (not shown) could be disposed upstream of compactor 38, if desired, to facilitate termination and/or restart of a printing operation.

FIG. 2 illustrates an alternative embodiment of head 16. In this example, a single head may include components common with heads 16A and 16B that are integrated into a common package that together perform both CF3D® and AFP operations. For instance, head 16 of FIG. 2 may include a common base 40, to which cure enhancer(s) 23, outlet 24, matrix reservoir 26, compactor 28, creel 30, collimator 34, heating mechanism 36, and/or compactor 38 are operatively mounted. Base 40 may be connected to support 14, and head 16 of FIG. 2 may be activated to selectively dispense in-situ wetted reinforcements (e.g., via CF3D® components) and/or pre-impregnated reinforcements (e.g., via AFP components).

In one example, both in-situ wetted reinforcements and pre-impregnated reinforcements may be discharged at the same time. For example, outlet 24 may dispense the in-situ wetted reinforcement (e.g., a functional reinforcement such as a wire or an optical fiber), which is thereafter at least partially covered by a pre-impregnated reinforcement (e.g., glass or carbon) pressed against the in-situ wetted reinforcement by compactor 38. The covering of pre-impregnated reinforcement may function as a protective, isolating, shielding, and/or dispersing cover for the functional reinforcement. In one example, the optical fiber may be activated to illuminate desired portions of structure 12, and the glass covering may protect the optical fiber from environmental conditions and/or function to disperse light from the optical fiber in a desired manner.

In the above example, operation of cure enhancer(s) 23 and heating mechanism 36 may be coordinated in several different ways. For example, cure enhancer(s) 23 may be selectively activated to only partially cure (e.g., cure to a B-stage) or to fully cure the in-situ wetted reinforcements prior to overlapping the in-situ wetted reinforcements with the pre-impregnated reinforcements. It is also contemplated that cure enhancer(s) 23 may not be activated at all and that the in-situ wetted reinforcements are either completely uncured prior to overlapping or partially or fully cured via energy generated by heating mechanism 36. In the latter example, it may be possible to completely eliminate cure enhancer(s) 23, if desired.

Similarly, operation of compactors 28 and 38 may be coordinated. For example, compactor 28 may be configured to compact the in-situ wetted reinforcements at a first pressure that is a percent of a second pressure exerted by compactor 38 on the pre-impregnated reinforcement. Alternatively, compactor 28 may be completely eliminated and compactor 38 may function to provide sole compaction of the in-situ and pre-impregnated reinforcements.

In some embodiments, a width of the pre-impregnated tape discharged over the top of the in-situ wetted reinforcements may be different than a width of the in-situ wetted reinforcements. For example, the tape width may be greater (e.g., multiple times greater), such that transverse edges of the tape extend past the in-situ wetted reinforcements and bond to structure 12 at the sides of and/or at a layer underlying the in-situ wetted reinforcements. This may help to create a seal around the in-situ wetted reinforcements.

In another embodiment of head 16, it is contemplated that the pre-impregnated reinforcements could be discharge through outlet 24, if desired. For example, the pre-impregnated reinforcements could be passed through matrix reservoir 26 where additional matrix is applied prior to discharge. Alternatively, the pre-impregnated reinforcements could be passed through matrix reservoir 26 at a time when no matrix is present in or advancing into reservoir 26, such that the pre-impregnated reinforcements do not pick up any additional matrix. In yet another alternative, matrix reservoir could be modular and selectively removed during discharge of the pre-impregnated reinforcements from outlet 24. In a final embodiment, the pre-impregnated reinforcements could bypass matrix reservoir and enter outlet 24 at a downstream location. In any of these embodiments, it may be possible to eliminate heating mechanism 36 and/or one of compactors 28 and 38. This may provide a more compact and inexpensive head 16.

When using head 16 of FIG. 2 to discharge composite material (i.e., in-situ wetted reinforcement and/or pre-impregnated reinforcement), regulation of support 14 may need to be controlled differently depending on the material(s) being discharged. In particular, head 16 may have two different tool center points (shown as TCP in FIG. 2). Each TCP may correspond with a point or line of contact between an associated compactor (28 or 38) and structure 12, and support 14 may position head 16 based on a known location of the TCP(s) currently being used in association with material discharge. For example, during discharge of in-situ wetted reinforcement, the TCP location associated with compactor 28 may be utilized to correctly position head 16. In another example, during discharge of pre-impregnated reinforcement, the TCP location associated with compactor 38 may be utilized to correctly position head 16. And in a final example, when both in-situ and pre-impregnated reinforcements are being discharged, the locations of both TCPs may be taken into consideration. The TCP(s) that should be considered when position head 16 may be determined based on a tool path predetermined for structure 12.

Referring back to FIG. 1, a controller 42 may be provided and communicatively coupled with support(s) 14 and head(s) 16. Each controller 42 may embody a single processor or multiple processors that are configured to control an operation of system 10. Controller 42 may include one or more general or special purpose processors or microprocessors. Controller 42 may further include or be associated with a memory for storing data such as, for example, design limits, performance characteristics, operational instructions, tool paths, and corresponding parameters of each component of system 10. Various other known circuits may be associated with controller 42, including power supply circuitry, signal-conditioning circuitry, solenoid driver circuitry, communication circuitry, and other appropriate circuitry. Moreover, controller 42 may be capable of communicating with other components of system 10 via wired and/or wireless transmission.

One or more maps may be stored in the memory of controller 42 and used during fabrication of structure 12. Each of these maps may include a collection of data in the form of lookup tables, graphs, and/or equations. In the disclosed embodiment, the maps may be used by controller 42 to determine the movements of heads 16 (e.g., the locations of TCPs) required to produce desired geometry (e.g., size, shape, material composition, performance parameters, and/or contour) of structure 12, and to regulate operation of cure enhancer(s) 23, compactor 28, heating mechanism 36, compactor 38, and/or other related components in coordination with the movements.

FIGS. 3, 4, 5A, and 5B illustrate examples of structures 12 that may be fabricated via system 10. These figures will be discussed in more detail in the following section to further illustrate the disclosed concepts.

INDUSTRIAL APPLICABILITY

The disclosed system may be used to manufacture composite structures having any desired cross-sectional shape and length. The composite structures may include any number of different continuous fibers of the same or different types and of the same or different diameters, and any number of different matrixes of the same or different makeup. Operation of system 10 will now be described in detail.

At a start of a manufacturing event, information regarding a desired structure 12 may be loaded into system 10 (e.g., into controller 42 that is responsible for regulating operations of supports 14 and/or heads 16). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), functional requirements, matrix specifications (e.g., cure parameters), reinforcement specifications, etc. It should be noted that this information may alternatively or additionally be loaded into system 10 at different times and/or continuously during the manufacturing event, if desired. Based on the component information, one or more different reinforcements and/or matrixes may be selectively installed and/or continuously supplied into system 10.

To install unimpregnated reinforcements into head 16A of FIG. 1 (and/or the CF3D® portion of head 16 of FIG. 2), individual fibers, tows, and/or ribbons may be passed through matrix reservoir 26, through outlet 24, past cure enhancer(s) 23, and under compactor 28 (i.e., between compactor 28 and an adjacent surface of structure 12 and/or part holder 18). In some embodiments, the reinforcements may also need to be connected to a pulling machine (not shown) and/or to a mounting fixture (e.g., to part holder 18). Installation of the matrix may include filling head 16A (e.g., reservoir 26) and/or coupling of an extruder or other source of pressurized matrix (not shown) to head 16A.

To install pre-impregnated reinforcements into head 16B of FIG. 1 (and/or the AFP portion of head 16 of FIG. 2), spools 32 of fibers, tows, and/or ribbons may be mounted to creel 30. The reinforcements may then be fed and/or pulled through collimator 34, past heating mechanism 36, and under compactor 38. In some embodiments, the reinforcements may also need to be connected to a pulling machine (not shown) and/or to a mounting fixture (e.g., to part holder 18).

The component information may then be used to control operation of system 10. For example, the in-situ wetted and/or pre-impregnated reinforcements may be pulled and/or pushed from head(s) 16. Support(s) 14 may also be controlled to selectively move head(s) 16 and/or platform 20 (referring to FIG. 1) in a desired manner (e.g., based on known positions of TCP(s), known kinematics of support(s) 14, known position of platform 20, and/or known geometry of structure 12) such that the resulting structure 12 is fabricated as desired. Operating parameters of cure enhancer(s) 23, compactor 28, heating mechanism 36, compactor 38 and/or other components of system 10 may be adjusted in real time during material discharge to provide for desired bonding, strength, and other characteristics of structure 12. Once structure 12 has grown to a desired length, structure 12 may be severed from system 10.

Figures 3, 4:
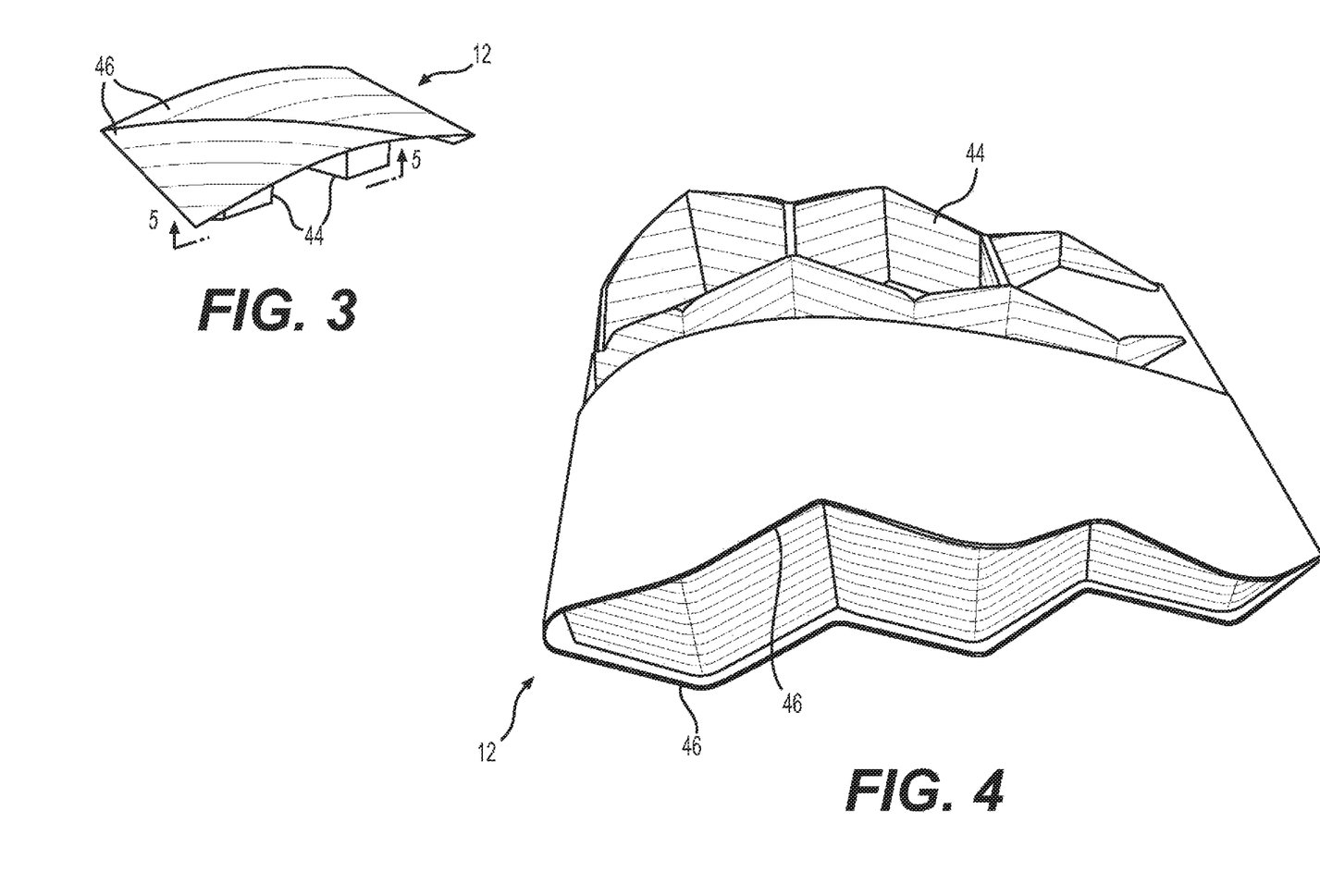
FIGS. 3 and 4 are isometric illustrations of a structure that may be fabricated with the additive manufacturing system of FIG. 1.

As shown in FIGS. 3 and 4, AFP and CF3D® functions of head(s) 16 may be used together to fabricate unique aspects of structure 12. For example, CF3D® may be used to fabricate a permanent internal or external structure 44 that functions as a mold, core, and/or mandrel, over which AFP may subsequently place a skin or outer surface 46 of pre-impregnated reinforcements. In this example, cure enhancers 23 may only partially cure the in-situ coated reinforcements (e.g., only enough to maintain a desired shape and size during subsequent tape application). After the tapes of pre-impregnated reinforcements have been placed onto the mold, core, and/or mandrel, the entire structure 12 may be placed into an autoclave for completion of the curing process. By only partially curing the in-situ coated reinforcements, enhanced bonding between the in-situ coated reinforcements and pre-impregnated tapes may be realized during autoclave curing of both the CF3D® and AFP fabricated portions of structure 12. In addition, a time required to complete structure 12 may be reduced.

In some embodiments, an autoclave may not be needed at all. For example, it may be possible for head 16A and/or the CF3D® components of the FIG. 2—head 16 to discharge functional reinforcements (e.g., metallic wires, optical fibers, etc.) against surfaces previously placed by head 16B and/or the AFP portion of the FIG. 2—head 16. Thereafter, these functional reinforcements may be selectively energized to generate cure energy directed toward the AFP-fabricated portions of structure 12, thereby causing these portions to cure. In another example, curing of the CF3D® portions of structure 12 (e.g., when triggered via light energy) may result in a self-supporting exothermic reaction that functions to initiate curing of and/or through-cure the AFP fabricated portions of structure 12.

FIG. 3 illustrates an exemplary structure 12 made by combining the different printing technologies, with CF3D® being used to fabricate a honeycomb base that is then skinned via AFP. FIG. 4 illustrates a combination where CF3D® is used to make an internal honeycomb core, which is then covered on all sides with the tapes of pre-impregnated reinforcements. It is contemplated that AFP may alternatively be utilized first to fabricate a shell or base layer of pre-impregnated reinforcements, after which CF3D® is then used to fabricate structures from in-situ wetted reinforcements and/or to lay functional fibers onto the shell. As shown in FIGS. 3 and 4, the pre-impregnated tapes may include unidirectional reinforcements, woven reinforcements, or other configurations of reinforcements.

The ability to selectively discharge in-situ and pre-impregnated reinforcements with the same system 10 (and even the same head 16) may have many benefits. For example, normally expensive and/or permanent-use tooling (e.g., molds, inserts, etc.) may be replaced with cheaply fabricated and quickly customized tooling. In addition, in place of separate standardized cores, unique cores that have been customized for particular applications may be integrated with outer skins to form well-bonded monolithic components. This may lightweight structure 12 (e.g., by obviating the need for fasteners and/or reducing a density of structure 12), as well improve performance characteristics. Further, cheap durable pre-impregnated tapes may be used at locations where high-volume material deposition and/or fine surface finishes are required, while fragile, lightweight, and/or expensive in-situ wetted reinforcements (e.g., structural and/or functional reinforcements) may be utilized to enhance material properties and/or functionality at critical locations with a high-degree of accuracy. In some applications, layers of pre-impregnated tapes may be interleafed with layers of in-situ wetted reinforcements.

Figure 5A:
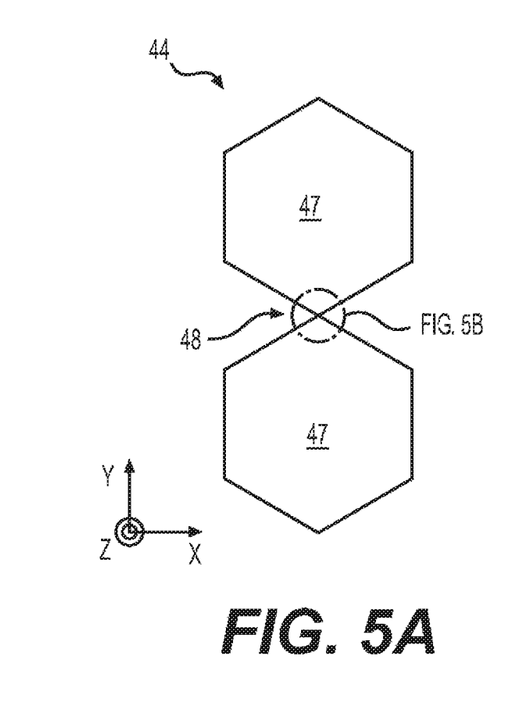
FIGS. 5B and 5A are schematic illustrations of an exemplary portion of the structures of FIGS. 3 and 4.
Figure 5B:
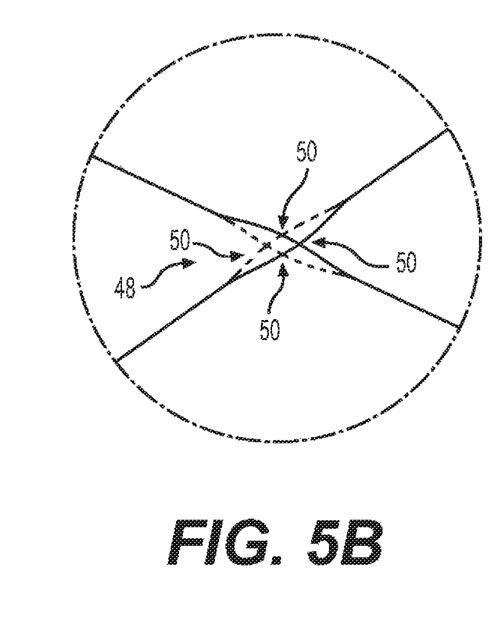

FIG. 5 illustrates one way that structure 44 may be fabricated. In this example, structure 44 is a honeycomb core, wherein generally identical hexagonal prisms ("prisms") 47 are fabricated adjacent each other as an integral unit. Adjacent prisms 47 may be connected to each other via one or more intersections 48. Because structure 12 may be fabricated by head 16A of FIG. 1 or head 16 of FIG. 2 utilizing in-situ wetted reinforcements that are continuous, a layer-by-layer tool path around a border of prisms 47 and through intersection(s) 48 may also be continuous. During completion of each layer of prisms 47, a z-height of prisms 47 may be increased by about one diameter of the wetted reinforcement. If the reinforcements were to cross each other at single point associated with intersection 48, however, intersection 48 would increase in z-height by about two diameters of the wetted reinforcement during completion of each layer. In some applications, this could be detrimental or unacceptable.

In order to maintain a z-height at intersection 48 that is about the same (e.g., within engineering tolerances) as a border z-height of prisms 47, care may be taken to cross reinforcements of differing layers at multiple locations. For example, when completing a first layer, the tool path may follow the dashed lines shown in FIG. 5A. And when completing a subsequent layer, the tool path may follow the solid lines shown in FIG. 5A. This may result in the in-situ wetted reinforcements crossing each other at a total of four different locations 50. During fabrication of each new layer of adjacent prisms 47, the continuous reinforcement may cross itself only once within the same layer at a first location 50. The continuous reinforcement may additionally cross a lower-layer portion of itself only once and at a second location 50. The first location may be oriented about 180 degrees from the second location relative to a center of intersection 48. During fabrication of a subsequent layer, the continuous reinforcement may again cross itself only once, but at a third location 50. The continuous reinforcement may additionally cross a lower-layer portion of itself only once and at a fourth location 50. The third and fourth locations may be oriented about 90 degrees from the first and second locations, respectively. In other words, the crossing locations may be different and alternate between adjacent layers. This alternating pattern may then be repeated as many times as required to produce a total desired z-height of structure 44.

Because each layer of the continuous reinforcement may cross itself only once at a particular location 50 for every two layers that are fabricated, a z-height total at intersection 48 after fabrication of two adjacent layers may be two diameters of the wetted reinforcement at any one location. This should match the z-height total at the borders of prisms 47 after fabrication of the two adjacent layers. In other words, following the pattern of FIG. 5A, prisms 47 should build up at their borders at about the same rate as at their intersections 48. It should be noted that structure 46 could have a shape (circles, ellipses, triangles, squares, etc.) other than hexagonal prisms 47, if desired.

It should be noted that, although FIGS. 5 and 5A show intersection 48 as having a general X-shape, it could have another shape if desired. For example, the reinforcements could arc into and/or out of crossing points 50, thereby making intersection 48 generally circular. Other shapes are also contemplated.

Further, it may be possible to cut and refeed the reinforcements at intersection 48, if desired. For example, during fabrication of a first layer, the reinforcement may pass directly through intersection 48. During a return of the reinforcement toward intersection 48, the reinforcement could be severed at a first side of intersection 48 and restarted at the opposing side. While a discontinuous reinforcement may have a lower strength, the overall z-height at intersection 48 would build at a same rate as a z-height at a border of structures 44.

It will be apparent to those skilled in the art that various modifications and variations can be made to the disclosed system and methods. Other embodiments will be apparent to those skilled in the art from consideration of the specification and practice of the disclosed system method. For example, although head 16 of FIG. 2 has been described as having dual TCPs, each associated with a particular fabrication technology (e.g., CF3D® and AFP), it is contemplated that other technologies could be combined with CF3D® in head 16. For instance, a fused deposition modeling (FDM), fused filament fabrication (FFF), and similar componentry may replace the AFP componentry and be used together with the CF3D® componentry. It is intended that the specification and examples be considered as exemplary only, with a true scope being indicated by the following claims and their equivalents.

What is claimed is:

1. A method of manufacturing a composite structure, comprising:
   directing a reinforcement tape that is pre-impregnated with a matrix past a heat source to tackify the reinforcement tape;
   compacting the tacky reinforcement tape to form a first portion of the composite structure;
   wetting a reinforcement with a matrix in-situ;
   placing the wetted reinforcement in a repeated geometric pattern to build up layers of substantially identical prisms that are adjacent to and connected to each other at an intersection, wherein the intersection includes multiple crossing points that deviate from the repeated geometric pattern and alternate locations between overlapping layers;
   compacting the wetted reinforcement to form a second portion of the composite structure;
   at least triggering curing the matrix; and
   autoclaving the composite structure to complete curing of the tacky reinforcement tape and the matrix.

2. The method of claim 1, wherein:
   the first portion of the composite structure is at least one of a shell and a skin; and
   the second portion of the composite structure is a core.

3. The method of claim 1, wherein the locations are oriented about 90° from each other relative to a center point of the intersection.

4. The method of claim 1, wherein the multiple crossing points are oriented about 180° from each other within the same layer relative to a center point of the intersection.

5. A method of manufacturing a composite structure, comprising:
   directing a reinforcement tape that is pre-impregnated with a matrix past a heat source to tackify the reinforcement tape;
   compacting the tacky reinforcement tape to form a first portion of the composite structure;
   wetting a reinforcement with a matrix in-situ;
   compacting the wetted reinforcement to form a second portion of the composite structure;
   at least triggering curing the matrix; and
   autoclaving the composite structure to complete curing of the tacky reinforcement tape and the matrix, wherein the reinforcement includes at least one of a metallic wire and an optical tube, and the method further includes selectively activating the at least one of the metallic wire and the optical tube after application to expose the first portion to energy that facilitates curing of the reinforcement tape.

6. A method of manufacturing a composite structure, comprising:
   depositing a pre-impregnated reinforcement tape, including at least one of a metallic wire and an optical tube, against a surface to form a first portion of the composite structure;
   wetting a reinforcement with a matrix in-situ;
   depositing the wetted reinforcement to form a second portion of the composite structure;
   at least partially curing the matrix to retain a shape of the second portion; and
   heating the composite structure to complete curing of at least the pre-impregnated reinforcement tape,
   wherein at least partially curing the matrix results in an exothermic reaction that at least partially cures the pre-impregnated reinforcement tape.

7. The method of claim 6, wherein heating the composite structure also completes curing of the matrix.

8. The method of claim 6, wherein at least partially curing the matrix includes exposing the matrix to a cure energy.

9. The method of claim 8, wherein the cure energy is light.

10. The method of claim 6, wherein the surface is formed by the wetted reinforcement.

11. The method of claim 6, wherein depositing the wetted reinforcement includes depositing the wetted reinforcement against the deposited pre-impregnated reinforcement tape.

12. The method of claim 6, further including tackifying the pre- impregnated reinforcement tape prior to depositing the pre-impregnated reinforcement tape.

13. The method of claim 6, wherein:
   the pre-impregnated reinforcement tape includes a tape pre-impregnated with a thermoset resin; and
   the matrix is a thermoset resin.

* * * * *